United States Patent Office 2,775,715
Patented Dec. 25, 1956

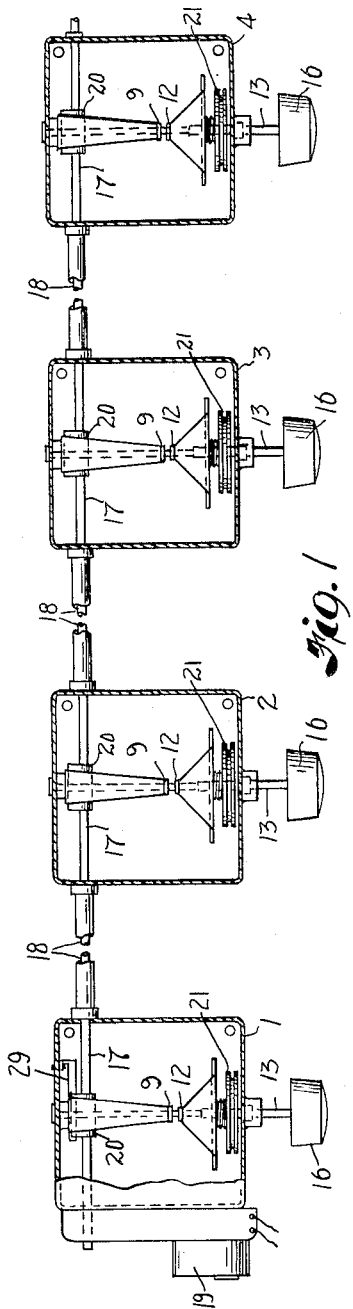

2,775,715

CONTROL SYSTEM FOR PLURALITY OF SPACED ELECTRICAL SWITCHES

Daniel Vern Tuttle, Kirkland, Ill., assignor, by mesne assignments, to Tuttle & Kift, Inc., Chicago, Ill., a corporation of Illinois Application January 4, 1954, Serial No. 402,034

6 Claims. (Cl. 307—96)

This invention relates as indicated to control systems of a plurality of electrical switches such as for example those used for the purpose of individually controlling the plural heating units found in domestic appliances such as stoves, ranges, and the like.

In appliances of this kind there are usually a plurality of heating elements each controlled by an individual switch. These elements are variously distributed on the stove or range and it has become increasingly common practice to similarly variously distribute the switches on the stove itself in order that various schemes of control for the individual heating units may be worked out to make more easy the use of the appliance.

Heating units of the kind commonly referred to as surface units have been provided with a means for controlling the temperature thereof commonly referred to as the off-and-on type wherein when the heating unit is energized, depending upon the setting of a dial for the selection of the heat desired, a constant speed electric motor will cyclically energize the heating unit so that during a given cycle the duration of time during which the heating unit is energized varies in accordance with the knob or control setting as aforesaid.

It is a principal object of my invention to provide a control system whereby a plurality of heating units may be controlled by individual switches located at any convenient place on the appliance and so interconnected that it is necessary to use only a single motor for the purpose of effecting the on-and-off control as above stated.

Other objects of my invention will appear as the description proceeds.

To the accomplishment of the foregoing and related ends, the invention, then comprises the features hereinafter fully described and particularly pointed out in the claims, the following description and the annexed drawing setting forth in detail one illustrative embodiment of the invention, this being indicative, however, of but one of the various ways in which the principle of the invention may be employed.

In said annexed drawing:

Fig. 1 is an assembly drawing, partially in section, showing a plurality of individual switches interconnected in accordance with the principles of my invention;

Fig. 2 is a transverse sectional view of one of the switches illustrated in Fig. 1, drawn to an enlarged scale;

Fig. 3 is a transverse sectional view of the assembly illustrated in Fig. 2 taken on the plane substantially indicated on line 3—3; and Fig. 4 is a schematic wiring diagram showing the manner in which two of the aforesaid switches are interconnected electrically, it being noted that on the wiring diagram of Fig. 4 any additional number of switches desired could be added while following the general scheme.

Referring now more specifically to the drawing and more especially to Fig. 1, there is here illustrated an assembly of a plurality of individual switches generally indicated at 1, 2, 3 and 4. Each of these switch units is identical with the other excepting that one of such switches will have associated therewith a driving motor in the manner and for the purposes hereinafter more fully explained. Since the individual switches are thus generally similar, one such has been shown in cross section in Fig. 2 wherein the numeral 5 generally refers to the container for the switch box. Mounted on the base 6 of the switch box is a terminal 7 carrying a flexible contact member 8 which is terminally provided with a make-and-break contact element 9. A second binding post 10 has connected thereto a flexible blade 11 which terminally is supplied with a make-and-break contact point 12.

Journalled in the opposite walls of the switch box is a control shaft generally indicated at 13 which at one side of the control box is provided with a collar 14 which is encompassed by a boss 15 and by which the shaft 13 is held against axial movement. The shaft 13 is terminally provided with a control knob 16 which will usually have associated therewith a pointer and scale which are not shown since they are not necessary for a full understanding of this invention.

Journalled in the switch housing is a shaft 17 which in the space between adjacent switch boxes is formed of a suitable flexible cable generally indicated at 18 so that the shaft 17 in all of the switch boxes are mechanically interconnected and may be driven simultaneously by a single motor generally indicated at 19 shown associated with one of the switches, in the drawings that switch being indicated by the reference character 1.

Mounted on the shaft 17 in each of the switch boxes is a cam generally indicated at 20 which upon rotation of the shaft 17 is effective to cause the switch blade 8 to flex back and forth so as to cyclically move the contact point 9 toward and away from the contact point 12.

As previously indicated when the cam 20 rotates the length of time during each such cycle of rotation during which the contact points 9 and 12 are closed will depend upon the physical position of the contact 12 in the path of movement of the contact point 9. For the purpose of adjusting the position of the contact point 12 there is provided a disc 21 slidably secured to the shaft 13 by means of the key 22. The position of the disc 21 axially on the shaft 13 is controlled by means of an adjusting screw 23 which passes through the wall of the switch housing and is held against axial displacement of a flange on the screw on the boss 24. At its inner end, the screw 23 is threadably engaged in an opening in a flexible blade 25 which is notched at its upper end and engages the disc 21 in a peripheral groove generally indicated at 26. Thus, adjustment of the screw 23 adjusts the position axially on the shaft 13 of the disc 21.

The disc 21 is provided with a threaded hub 27 which passes through a threaded opening in the flexible blade 11. By rotation of the knob 16 and consequently rotation of the shaft 13 and the threaded hub 27, the location of the contact point 12 may be adjusted with respect to the contact point 9.

Mounted on its inner end the shaft 13 has a second cam 27 which upon the rotation of the shaft 13 is adapted to close and open contact points 28 and 29 which are provided with binding posts 30 and 31 respectively.

In Fig. 4 there has been illustrated a diagrammatic wiring diagram by which illustration the manner in which the several switches are interconnected may be observed. In this connection it will be noted that the power lines 32 and 33 are adapted to have connected thereacross the heating units 34 and 35. The heating units 34 and 35 are adapted to be separately controlled by means of individual switch units, connected therewith in the manner illustrated in Fig. 4.

It will be observed that when the various switch boxes or switch units are connected in the circuit as illustrated in Fig. 4, the energization of any one heating unit as by a rotation of the control knob 16 on the controlling switch unit, the cam 27 in such switch unit will close the circuit for the single motor 19 so that the motor will continue to be energized so long as any single heating unit is energized.

By the use of the apparatus of my invention, it is possible by the use of a single motor and the interconnecting flexible cables extending between the several switches to variously place the switches as desired on the stove or the like and still have them control the several heating units in the desired manner.

Other modes of applying the principle of the invention may be employed, change being made as regards the details described, provided the features stated in any of the following claims or the equivalent of such be employed.

I, therefore, particularly point out and distinctly claim as my invention:

1. In a control system for a plurality of spaced electrical heating units, in combination:

A. A plurality of switch units adapted to be mounted in spaced relation and respectively to control the circuits of said heating units;
B. A cam means in each such switch unit effective upon rotation to cyclically actuate the switch unit;
C. A flexible drive shaft interconnecting the cam means of the second switch units;
D. An electric motor for driving said flexible shaft; and
E. Means for energizing said motor when any of said switch units energize its associated heating unit.

2. In a control system for a plurality of spaced electrical heating units, in combination:

A. A plurality of switch units adapted to be mounted in spaced relation and respectively to control the circuits to said heating units, each such switch unit comprising: (a) a pair of relatively movable first and second make-and-break contact members adapted for connection in and to open and close the circuit of the heating unit with which such switch unit is associated; and (b) a rotatable cam effective upon rotation thereof to cyclically move said members relatively toward and away from each other;
B. A flexible drive shaft interconnecting the cams of the several switch units; and
C. An electric motor for driving said flexible shaft.

3. In a control system for a plurality of spaced electrical heating units, in combination:

A. A plurality of switch units adapted to be mounted in spaced relation and respectively to control the circuits to said heating units, each such switch unit comprising: (a) a pair of relatively movable first and second make-and-break contact members adapted for connection in and to open and close the circuit of the heating unit with which such switch unit is associated; and (b) a rotatable cam effective upon rotation thereof to cyclically move said first contact member toward and away from said second contact member whereby the time duration, if any, of the time span of each such cycle of movement during which such contact members are closed depends upon the physical location of such second contact member in the path of movement of the first contact member;
B. A flexible drive shaft interconnecting the cams of the several switch units; and
C. An electric motor for driving said flexible shaft.

4. In a control system for a plurality of spaced electrical heating units, in combination:

A. A plurality of switch units adapted to be mounted in spaced relation and respectively to control the circuits to said heating units, each such switch unit comprising: (a) a first pair of relatively movable first and second make-and-break contact members adapted for connection in and to open and close the circuit of the heating unit with which such switch unit is associated; (b) a second pair of relatively movable make-and-break contact members adapted for connection in and to open and close a control circuit; and (c) a rotatable cam effective upon rotation thereof to cyclically move the first contact member of said first pair toward and away from the second contact member of such pair whereby the time duration, if any, of the time span of each such cycle of movement during which such contact members are closed depends upon the physical location of such second contact member in the path of movement of the first contact member;
B. A flexible drive shaft interconnecting the cams of the several switch units;
C. An electric motor for driving said flexible shaft; and
D. An electric circuit for energizing said motor, such circuit including therein the said second pair of contact members of the several switch units whereby said motor will remain energized so long as any such second pair of contact members is closed.

5. In a control system for a plurality of spaced electrical heating units, in combination:

A. A plurality of switch units adapted to be mounted in spaced relation and respectively to control the circuits to said heating units, each such switch unit comprising: (a) a first pair of relatively movable first and second make-and-break contact members adapted for connection in and to open and close the circuit of the heating unit with which such switch unit is associated; (b) a second pair of relatively movable make-and-break contact members adapted for connection in and to open and close a control circuit; (c) a rotatable cam effective upon rotation thereof to cyclically move the first contact member of said first pair toward and away from the second contact member of such pair whereby the time duration, if any, of the time span of each such cycle of movement during which such contact members are closed depends upon the physical location of such second contact member in the path if movement of the first contact member; (d) manually adjustable means effective upon actuation simultaneously to vary the location of the second contact member of said first pair and to maintain closed said second pair of contacts when said second contact member is so positioned as to be engaged by said first contact member as the latter is moved cyclically by said cam, and
B. A flexible drive shaft interconnecting the cams of the several switch units;
C. An electric motor for driving said flexible shaft; and
D. An electrical circuit for energizing said motor, such circuit including therein the said second pair of contact members of the several switch units whereby said motor will remain energized so long as any such second pair of contact members is closed.

6. In a control system for a plurality of spaced electrical heating units, in combination:

A. A plurality of switch units adapted to be mounted in spaced relation and respectively to control the circuits to said heating units, each such switch unit comprising: (a) a first pair of relatively movable first and second make-and-break contact members adapted for connection in and to open and close the circuit of the heating unit with which such switch unit is associated; (b) a second pair of relatively movable make-and-break contact members adapted for connection in and to open and close a control circuit; (c) a rotatable cam effective upon rotation thereof to cyclically move the first contact member of said first pair toward and away from the second contact member of such pair whereby the time duration, if any, of the time span of each such cycle of movement during which such contact members are closed depends upon the physical location of such second contact member in the path of movement of the first contact member; (d) manually adjustable means effective upon actuation simultaneously to vary the location of the second contact member of said first pair and to maintain closed said second pair of contacts when said second contact member is so positioned as to be engaged by said first contact member as the latter is moved cyclically by said cam, and (e) means for adjustably varying the relation between the relative positions of said manually adjustable means and said manually adjustable means and said second contact members;

B. A flexible drive shaft interconnecting the cams of the several switch units;

C. An electrical motor for driving said flexible shaft; and

D. An electrical circuit for energizing said motor, such circuit including therein the said second pair of contact members of the several switch units whereby said motor will remain energized so long as any such second pair of contact members is closed.

References Cited in the file of this patent

UNITED STATES PATENTS

| | | |
|---|---|---|
| 2,275,918 | Newell | Mar. 10, 1942 |
| 2,503,082 | Tuttle | Apr. 4, 1950 |
| 2,599,171 | Freeman | June 3, 1952 |